United States Patent [19]

Chevakin et al.

[11] 4,000,228
[45] Dec. 28, 1976

[54] COOLING TOWER WITH REMOVABLE SPRAYING ELEMENTS

[76] Inventors: Ivan Vasilievich Chevakin, ulitsa Chaplygina, 3a, kv. 22; Leonid Semenovich Kravchenko, ulitsa Volkova, 14, kv. 22; Abram Izrailevich Pesin, ulitsa Kurkovaya, 177, kv. 8; Nikolai Petrovich Zharov, ulitsa Michurina, 143, kv. 8; Viktor Fedorovich Egorov, ulitsa Pervomaiskaya, 32a, kv. 6, all of Tula; Vyacheslav Ivanovich Gorbenko, ulitsa Kutuzova, 106, kv. 35; Alexandr Shloimovich Vasserman, ulitsa Vorovskogo, 31, kv. 5, both of Lvov; Vladimir Ivanovich Martynov, Kosaya Gora, ulitsa M. Gorkogo, 10, kv. 26, Tula, all of U.S.S.R.

[22] Filed: Mar. 8, 1974

[21] Appl. No.: 449,282

[52] U.S. Cl. .................. 261/111; 261/DIG. 11
[51] Int. Cl.² ................................ B01F 3/04
[58] Field of Search ............... 261/111, DIG. 11; 52/745, 747, 637, 638; 312/273, 334, 335; 104/135, 147 R, 165, 173 R

[56] References Cited

UNITED STATES PATENTS

| 694,067 | 2/1902 | McKenna | 104/173 R |
|---|---|---|---|
| 1,502,573 | 7/1924 | Kuhn | 261/DIG. 11 |
| 2,626,129 | 1/1953 | Obert | 261/111 X |
| 3,208,534 | 9/1965 | Kazarian | 261/111 X |
| 3,363,885 | 1/1968 | Meck | 261/DIG. 11 |
| 3,395,656 | 8/1968 | Ford et al. | 261/111 X |
| 3,588,049 | 6/1971 | Nectoux | 104/173 R X |
| 3,718,097 | 2/1973 | Latourneau et al. | 104/147 X |
| 3,731,824 | 5/1973 | Howlett | 104/135 X |
| 3,764,121 | 10/1973 | Fordyce | 261/111 |
| 3,768,416 | 10/1973 | Juechter | 104/135 |
| 3,799,640 | 3/1974 | Jacobs | 312/273 |
| 3,870,773 | 3/1975 | Luzaich | 261/111 |

Primary Examiner—Tim R. Miles
Assistant Examiner—Richard L. Chiesa
Attorney, Agent, or Firm—Lackenbach, Lilling & Siegel

[57] ABSTRACT

The cooling tower is characterized in that it has a three-dimensional framework made up of sections mounted on supports and adapted to be moved on carriers for withdrawal from the cooling tower, for which purpose openings are provided in the cooling tower walls adjacent to the framework sections, said openings being kept closed during the operation of the cooling tower.

11 Claims, 12 Drawing Figures

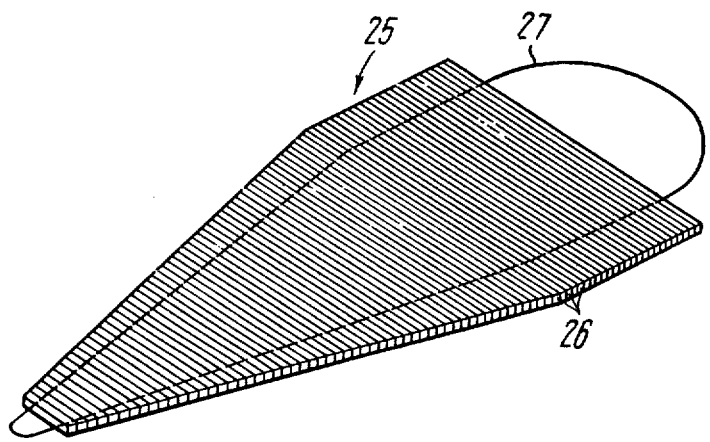
FIG.8
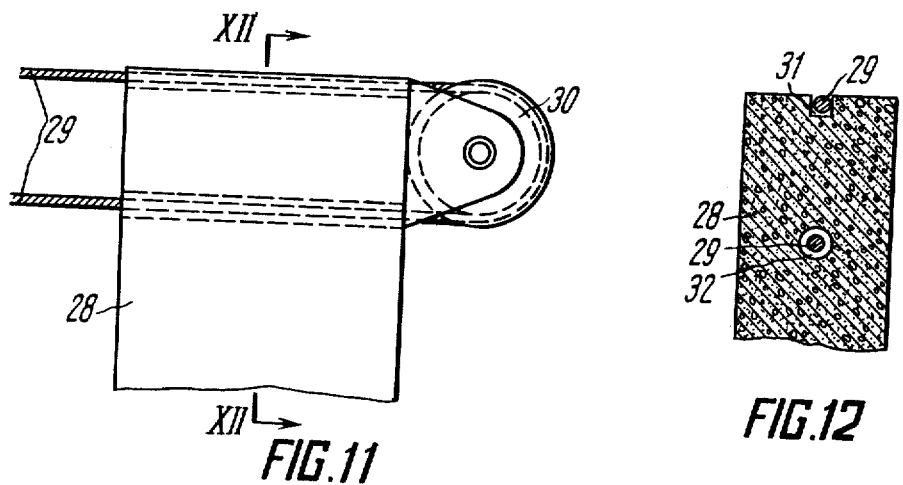
FIG.11
FIG.12

COOLING TOWER WITH REMOVABLE SPRAYING ELEMENTS

The invention relates to circulating water evaporative coolers used in power-plant and industrial applications and has particular reference to cooling towers of the atmospheric and blower type which effect water cooling by the use of water spraying arrangements and the effects of air draft.

Widely known are water cooling towers in which the spraying arrangement is constructed in the form of single or grouped elements freely mounted or suspended in a three-dimensional framework installed on supports.

As a rule, the framework which mounts the spraying arrangement in the cooling towers under consideration is of rigid construction, being either solid or composed or rigidly jointed precast concrete or metal elements.

In such cooling towers the framework is constructed of columns and tiers of beams mounting the spraying elements. The columns are braced together and fixed to the supports (rigidly, for the most part) so that the framework cannot move relative to the supports.

With this construction, it is difficult to replace failed spraying elements. Another disadvantage is that failed spraying elements cannot be replaced without discontinuing the operation of the cooling tower. Since the spraying arrangement is mounted in a rigid framework fixedly secured to the supports, the replacement of the spraying elements has to be carried out within the cooling tower, for which purpose the latter has to be cut off from the associated heat exchanging equipment.

On the other hand, it is very important that the replacement of the spraying elements be carried out without interrupting the operation of the cooling tower. Solving this problem will eliminate the need for stand-by cooling towers as well as for reserve capacity required for joint operation in case of major repairs.

A further disadvantage lies in that the construction of the cooling tower does not permit of mechanizing the replacement of the spraying elements, resulting in lengthy repairs and high repair costs.

The cooling towers under review also suffer from the following disadvantage. As more and more spraying elements become inoperative due to damage or accumulation of salt deposits, the total cooling surface of the spraying arrangement decreases and aerodynamic drag on the movement of the cooling air increases, adversely affecting the effectiveness of the cooling tower. As a result the temperature of the circulating water rises above the required point.

The failure of the spraying elements revealed by inspection or by variation from the required characteristics, such as the temperature of the cooled water, calls for remedial work or replacements. However, to take these measures, the operation of the cooling tower has to be discontinued. Under the circumstances, the replacements have to be postponed until major repairs are made, so that the cooling tower is operated with reduced efficiency. During this period the number of failed spraying elements may increase dangerously, causing stoppage of the cooling tower. It follows that the cooling towers in question are not sufficiently dependable.

A further disadvantage of this cooling tower construction is that failed members of the framework which mounts the spraying arrangement cannot be replaced without discontinuing the operation of the cooling tower.

A still further disadvantage is that, inasmuch as the supports of the framework are located inside the cooling tower, an additional aerodynamic drag on the current of the cooling air is caused in the space under the framework, adversely affecting the cooling action.

Since the replacement of the spraying elements is not mechanized and has to be carried out in close quarters, it is difficult to provide safe working conditions.

The location of the framework supports inside the cooling tower hampers the removal of ooze deposits from the cooled circulating water, increasing operating costs.

It is an object of the present invention to provide a cooling tower wherein the spraying elements are mounted in a three-dimensional framework constructed in such a manner as to make it possible to readily replace the spraying elements, to effect the replacement during the operation of the cooling tower, to replace said spraying elements without delay in the event of impaired cooling action of the spraying arrangement (i.e., to improve the dependability of the spraying arrangement), to mechanize repair work and ensure high quality thereof, to reduce aerodynamic drag on the current of cooling air, to simplify the removal of ooze deposits from the cooled circulating water and thereby to improve the performance of the cooling tower and to reduce construction and operating costs.

This object is achieved by providing a cooling tower wherein the spraying elements are installed in a three-dimensional framework mounted on supports. According to the invention, the framework is made up of sections mounted on said supports and adapted to be moved on carriers out of the cooling tower, for which purpose openings are provided in the walls of the cooling tower, said openings being kept closed during the operation of the cooling tower.

The carriers can be constructed in the form of girders mounted on supports located in the centre and outside of the cooling tower.

In another embodiment the carriers can be made in the form of steel-wire ropes mounted on supports located in the centre and outside of the cooling tower.

It is desirable that after a framework section with the associated spraying elements is moved out of the cooling tower a temporary flexible floor be installed in place of said section for the cooling air flow to be uniformly distributed in the space under the framework throughout the cooling tower area.

The invention consists essentially in the following.

The framework is made up of sections with single or grouped spraying elements mounted or suspended therein, said sections being adapted to move on horizontal carriers secured on supports. The load imposed by said framework and spraying elements on the carriers and, consequently on the supports remains constant during the operation of the cooling tower.

In the construction involved, with the framework sections adapted to move on carriers, the force required to move a section on the carriers depends on the weight of the section, the material of the contacting surfaces and the measures taken to reduce the coefficient of friction, i.e., lubricating the rubbing surfaces, employing rollers or facing the contacting surfaces with plastic materials having a low friction coefficient.

Given these conditions and the sections being positioned clear of one another, the force required to move a framework section on the carriers is by far less than the maximum load imposed on the supports.

Hence, by applying such a force, a framework section can be moved on the carriers out of the framework and cooling tower, thereby taking out a portion of the spraying arrangement for replacement or repair on a platform outside the cooling tower, the latter continuing to operate.

To enable the spraying elements to be taken out together with the associated section, the water distributing system should also be of sectional construction, employing separate manifolds.

The invention provides improved dependability of the cooling tower inasmuch as inoperative spraying elements are enabled to be replaced by moving them out together with the associated framework section so that the cooling capacity of the tower can be restored without delay.

The sectional repair of the spraying arrangement does not necessitate discontinuing the operation of the cooling tower. The repair process can be simplified and repair time saved by using a stand-by section with the spraying elements installed therein, said stand-by section being previously prepared on an outside platform.

The method of making repairs on an outside platform provides much more working area than inside the cooling tower, making it possible to use various hoisting and power facilities. Thus, by employing a sectional framework to accommodate the spraying arrangement the invention provides for mechanization and high quality of repair work.

Locating the supports of the framework section outside the cooling tower permits the reduction of aerodynamic drag on the cooling air flow in the space under the framework and facilitates removing ooze deposits, which improves the cooling performance of the tower and reduces operating cost.

Now the invention will be described in detail with reference to the accompanying drawings in which:

FIG. 8 is a perspective view of a temporary flexible floor.

FIG. 11 is a partial detail view in the direction of the arrow A of FIG. 10 showing part of the support for the carrier constructed of ropes.

FIG. 12 is a cross sectional view taken along the line XII—XII of FIG. 11.

The cooling tower 1 (FIG. 1) rests on supports 2 (FIGS. 2 and 3) constructed in the form of columns. The supports 2 are fixedly secured to foundations 3 (FIG. 4).

Figure 1:
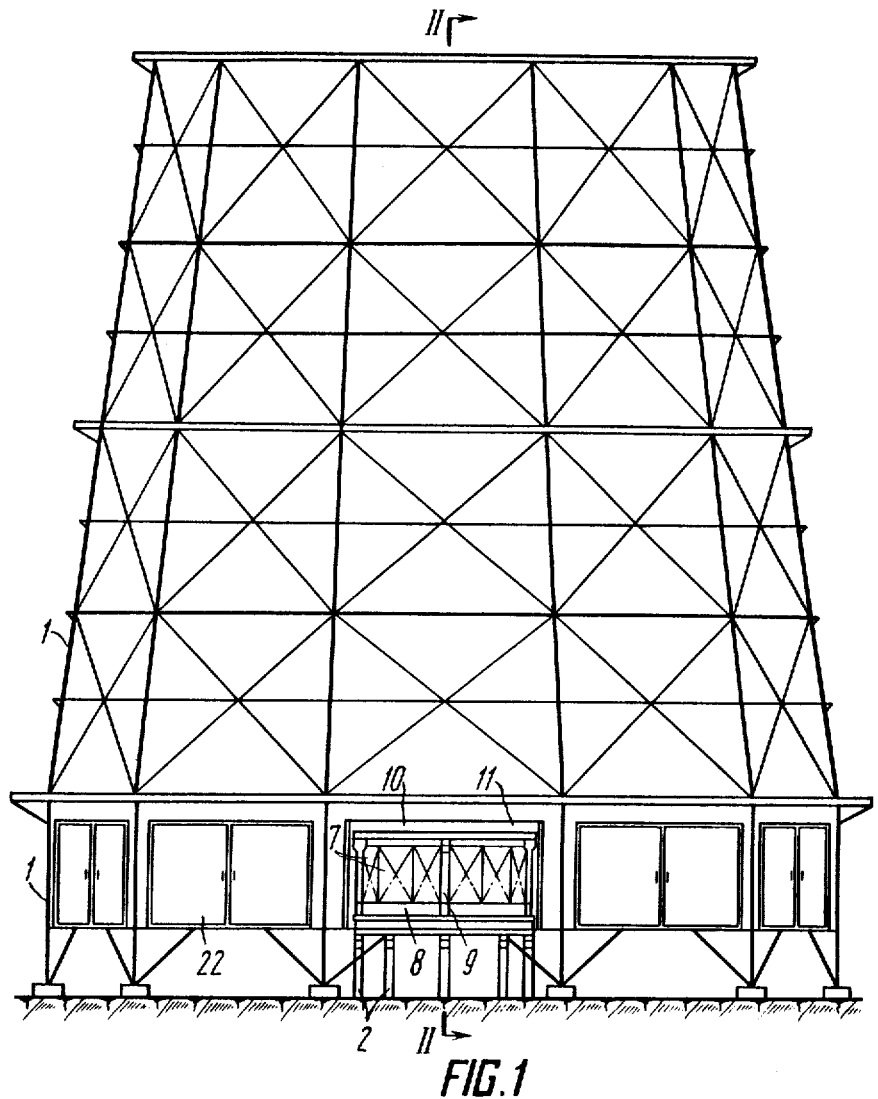
FIG. 1 shows a front elevational view of the cooling tower.
Figure 2:
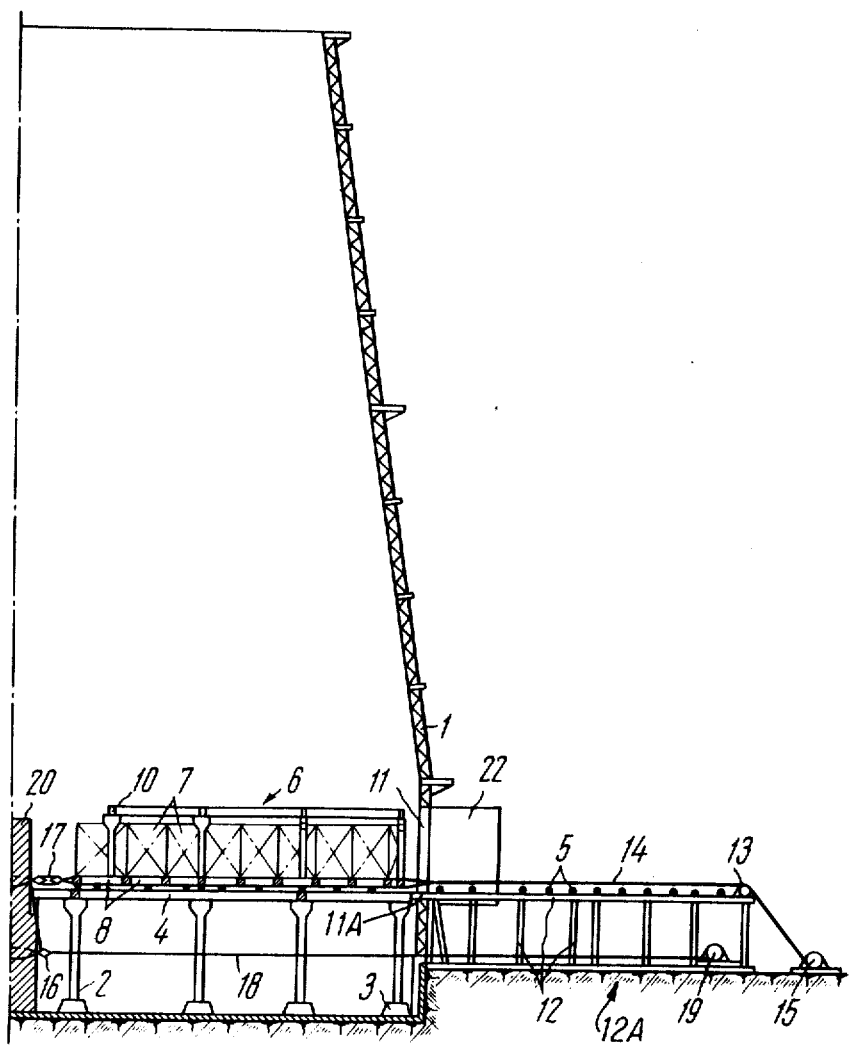
FIG. 2 is a partial cross sectional view taken along the line II—II of FIG. 1.
Figure 4:
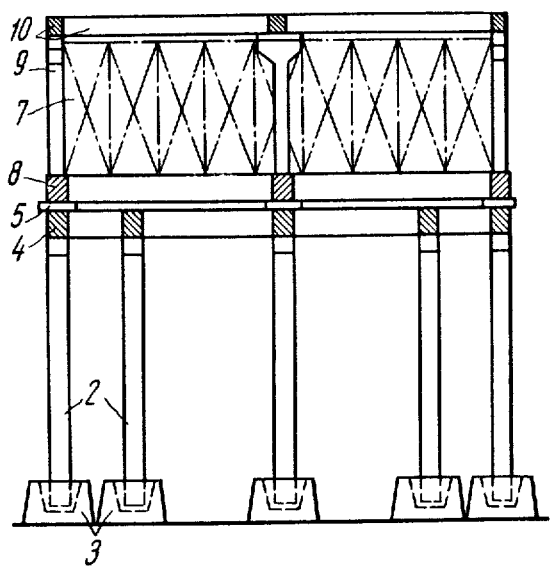
FIG. 4 is a cross-sectional view taken along the line III—III of FIG. 3.

As best shown in FIGS. 2 and 4, horizontally diposed girders are secured to the supports 2 to serve as carriers 4. The carriers 4 are spaced apart, so as to be able to support a three-dimensional framework section 6 without the framework section 6 falling through to the bottom of the tower. A plurality of rollers 5 are disposed between the carriers 4 and the framework section 6. These rollers 5 are essentially cylindrical in shape and are used to facilitate the moving of the framework section 6 with respect to the carriers 4. It is possible to not use the rollers 5, but only if a low coefficient of friction exists between these two surfaces. Compartments for the framework sections 6 are defined by the carriers 4 and are all in a common horizontal plane, as shown in FIG. 1.

Figure 3:
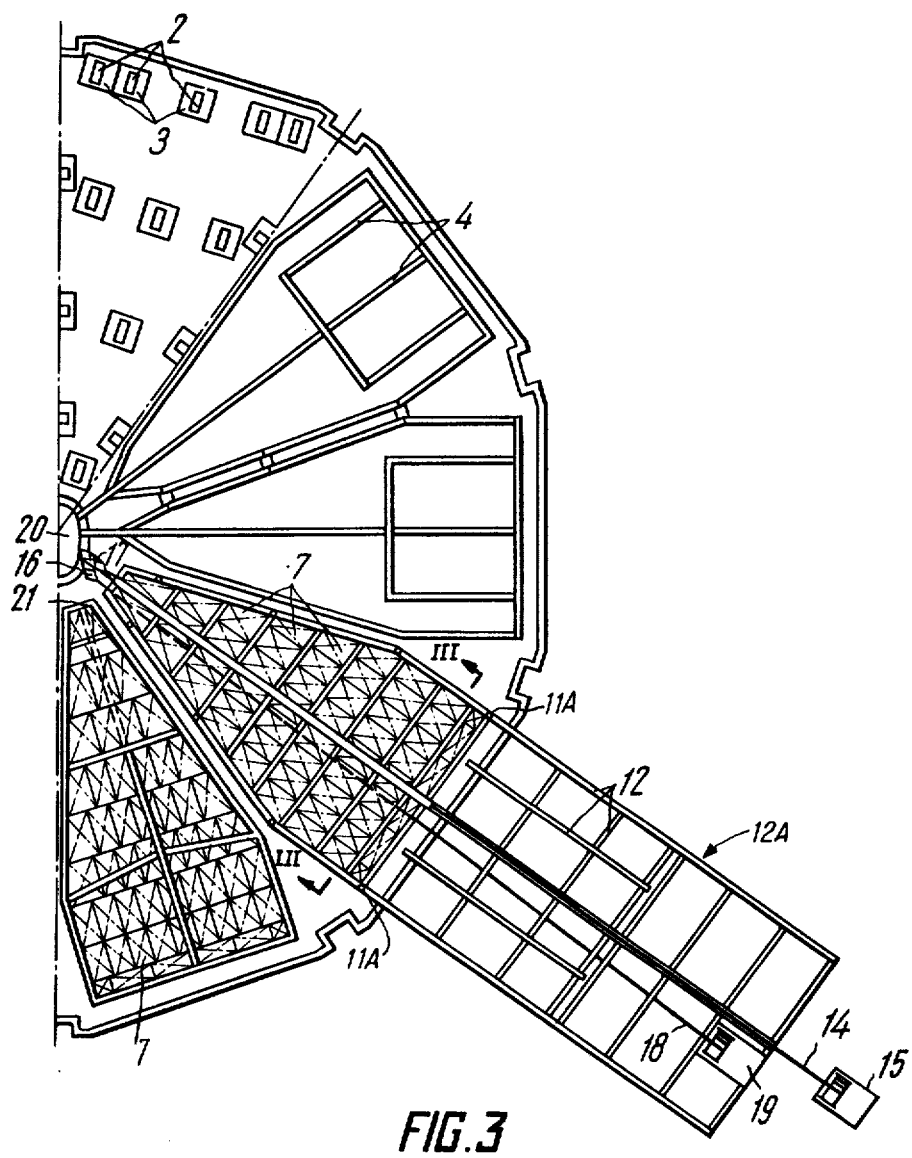
FIG. 3 is a partial plan view of the cooling tower showing supports, carriers, framework sections and an external platform.
Figure 5:
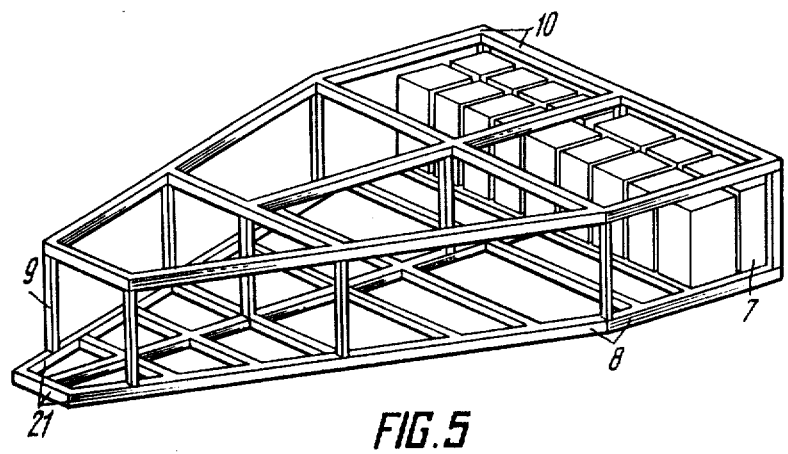
FIG. 5 is a perspective view of a framework section.

A typical framework section 6 is shown in FIG. 5. This figure shows some of the spraying elements 7 removed, so as to better illustrate the construction of the framework section 6. Each framework section 6 consists of beams 8 and 10 and pillars 9. The beams 8 are rigidly joined together to form the bottom of the framework section 6. The beams 10 are rigidly joined together to form the top of the framework section 6. The pillars 9 are used to rigidly join together the top and bottom in order to form a three-dimensional frame. The rigid joining of these members may be done in any suitable manner, as by welding. The spraying elements 7 are disposed in the framework section 6 as shown. FIG. 3 shows how the framework section 6 is capable of holding a plurality of such spraying elements 7.

To enable the framework sections to be moved out of the cooling tower, openings 11 are provided in the tower walls adjacent to the sections.

As best shown in FIGS. 2 and 3, a temporary platform 12A is removably attached to the carriers 4 at point 11A. This platform 12A has supports 12 and is in close juxtaposition to a framework section 6. A pull-out winch 15 is positioned outside the platform 12A in line with the platform 12A and the framework section 6. A rope 14 is connected at one end to the winch 15. The other end of the rope 14 passes through an idler pulley 13, positioned at the outside edge of the platform 12A, and is then connected to the center of the framework section 6. Additional rollers 5, similar to the rollers 5 on the carriers 4, are placed on the top of the platform 12A to facilitate the movement of the framework section 6 with respect to the platform 12A.

When the winch 15 is activated it collects the rope 14 and thus moves the framework section 6 outwardly from the tower 1 onto the platform 12A. Maintenance crews can now clean or repair the spraying elements 7 without disrupting the operation of the tower 1.

A pull-in winch 19 is positioned underneath the platform 12A. One end of a rope 18 is connected to the winch 19. The other end passes through an idler pulley 16 and a tackle 17 and is then connected to the inner end 21 of the framework section 6. The pulley 16 and tackle 17 are supported by a central water distributing standpipe 20. When the winch 19 is activated it collects the rope 18 and thus pulls the framework section 6 back into the tower 1 from the platform 12A.

During the operation of the cooling tower openings 11 are kept closed with cover plates 22 (FIG. 1).

Figure 6:
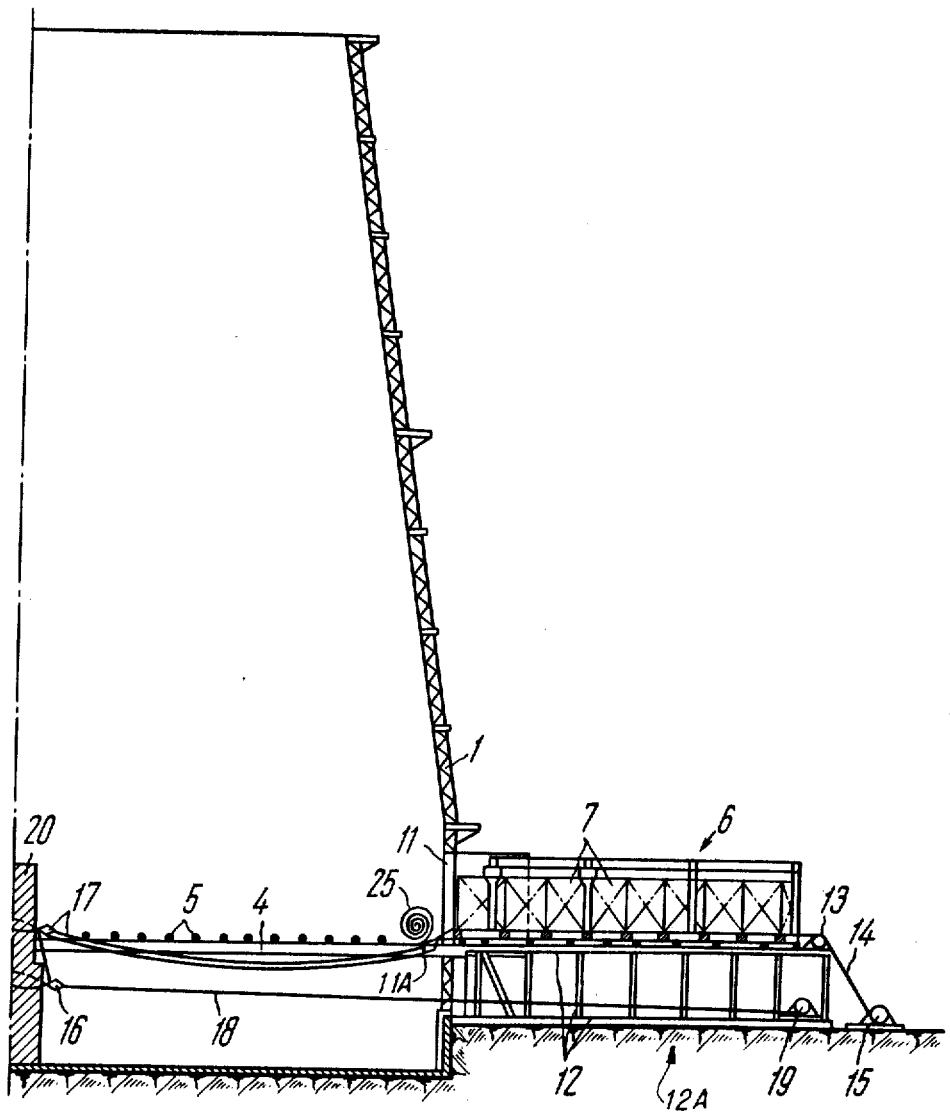
FIG. 6 is a view similar to FIG. 2 showing a first alternate embodiment of the cooling tower wherein the support girders extend radially outward from the center of the cooling tower and the framework section is moved outside the cooling tower onto an external platform.
Figure 7:
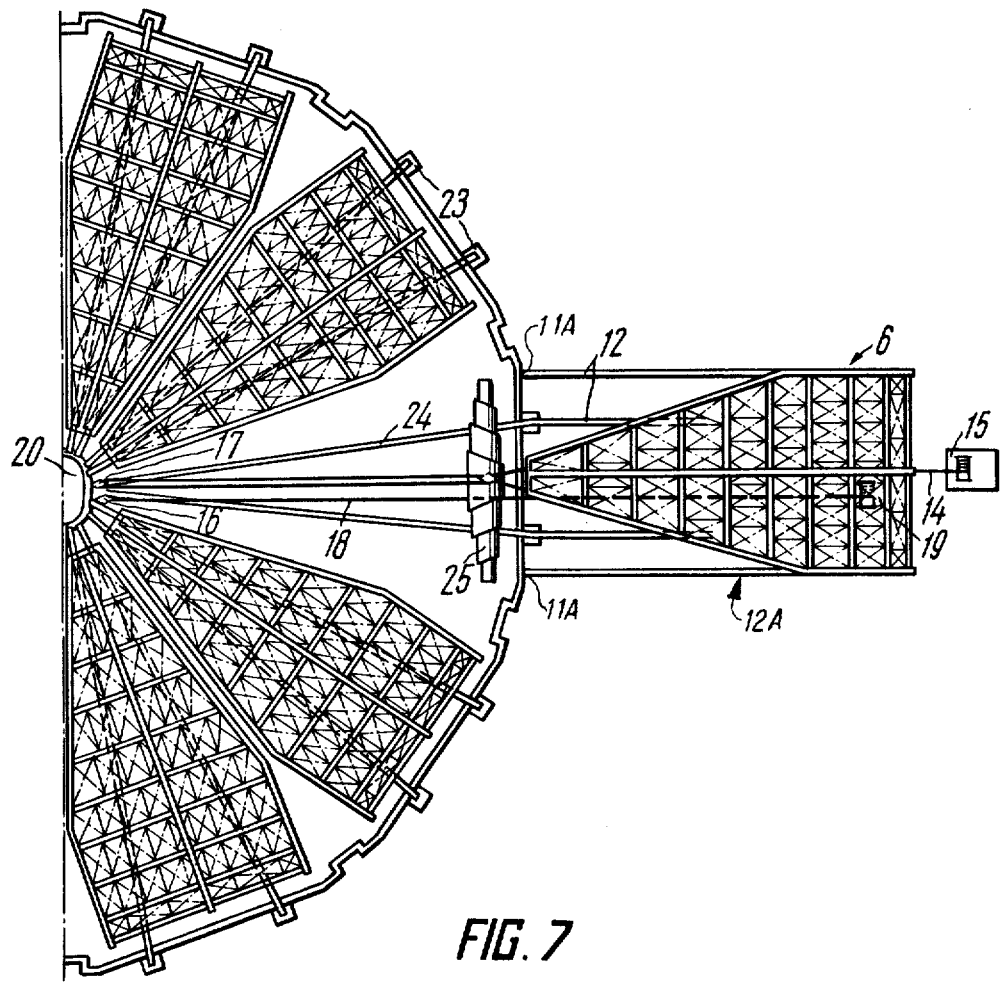
FIG. 7 is a view, similar to FIG. 3, of the alternate embodiment of FIG. 6.
Figure 9:
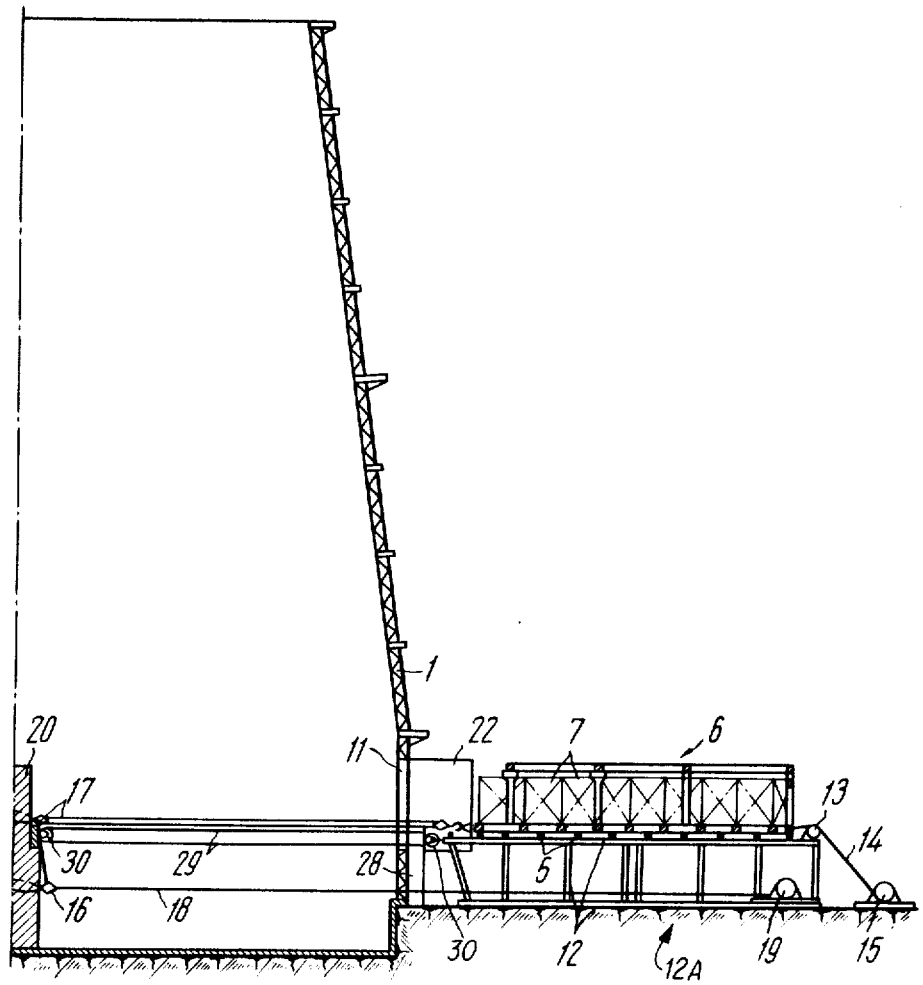
FIG. 9 is a view similar to FIG. 6 of a second alternate embodiment of a cooling tower with the framework supports located outside the tower and showing the carriers constructed of ropes.
Figure 10:
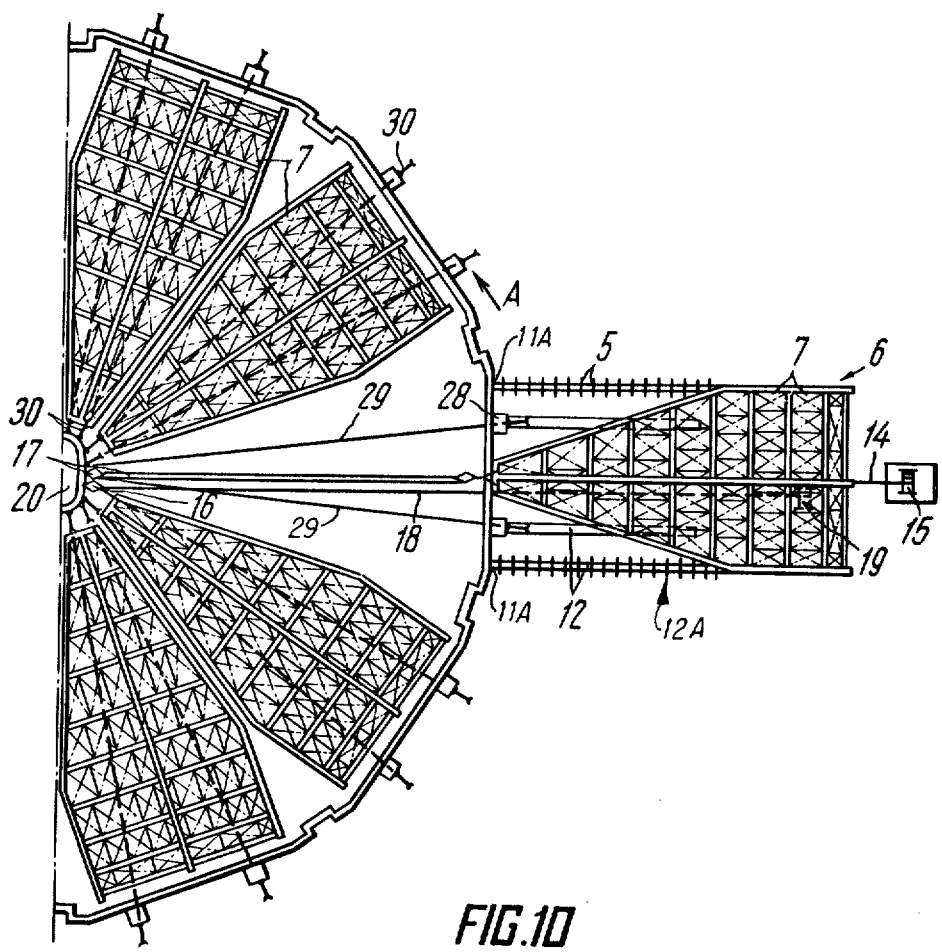
FIG. 10 is a view similar to FIG. 7 of the embodiment of the cooling tower shown in FIG. 9.

FIGS. 6 and 7 show another embodiment of the cooling tower 1 identical to the previous embodiment except for two small details. Firstly, the second embodiment does not have interior supports, such as supports 2, to hold the tower 1 up; it has, instead, a plurality of supports 23, positioned around the periphery of the tower 1, to hold it up. Secondly, the carriers 4 are replaced by carriers 24, which are girders projecting radially outward from the center of the tower 1. This arrangement works just as well, because the framework section 6 (FIG. 5) is essentially in the shape of a slice of pie. As shown in FIG. 7, the rollers 5 may be omitted from this embodiment.

To provide for normal operation of the cooling tower when making the replacement of the spraying elements 7 on the platform 12a, a temporary flexible floor 25 is to be installed on the carriers 4 in place of the withdrawn section 6. The floor 25 is composed of planks 26 (FIG. 8) held together by a rope 27 passed therethrough. Such a construction of the floor permits of rolling it up.

FIGS. 9, 10, 11 and 12 show a third embodiment with carriers constructed of ropes. The supports 28 of this embodiment are positioned, as are the supports 23 of the second embodiment. In this embodiment the ropes 29 are used instead of the radially extending carriers 24. The ropes 29 are made into an endless rope by passing them through pulleys 30. One pulley 30 is secured to the support 28 and the other to the standpipe 20. Slots 31 (FIG. 12) and holes 32 are provided in the top portion of the supports 28 for the ropes 29 to pass.

According to the invention, the carriers 4, 24, 29 may be permanent elements of the cooling tower construction. In this case they are mounted on the supports 2, 20, 28 and carry the framework sections 6 with the spraying elements 7 accommodated therein.

It may be desirable that said carriers should not be permanent elements of the cooling tower construction. In this case framework sections 6 with spraying elements 7 accommodated therein are mounted direct on the supports 2, 20, 28 and temporary carriers are mounted on the supports when the spraying elements 7 have to be replaced. Upon completion of the job the temporary carriers are removed.

According to the invention, the replacement of the spraying elements 7 is effected as follows.

The relevant framework section 6 together with the spraying elements concerned is pulled out of the cooling tower through the opening 11 and moved onto the platform 12a by means of the winch 15 which operates the rope 14 passed over the idler pulley 13 and attached to the outward end of the lower frame of the framework section 6. The pull exerted by the winch 15 causes the framework section 6 to ride on the rollers 5 over the carriers 4.

The temporary floor 25 is unrolled to cover the place vacated by the framework section 6 and the opening 11 in the cooling tower wall is closed with the cover plate 22.

With the framework section 6 on the platform 12, the required replacement or repair work is performed on the spraying elements 7 and the framework section 6 structural members, the working area provided by the platform making it possible to use appropriate hoisting and power facilities.

Before returning the framework section 6 into the working position on the supports 2, the temporary floor 25 is rolled up and taken out of the cooling tower, the idler pulley 16 and the tackle 17 are attached to the central water distributing standpipe 20 and the opening 11 is uncovered.

To return the framework section 6, it is moved on rollers 5 over the carriers 4 by means of the winch 19 which operates the rope 18 passed over the idler pulley 14, reeved in the tackle 17 and attached to the inward end member 21 incorporated in the lower frame of the framework section 6. The pull exerted by the winch 19 causes the framework section 6 to come back into the cooling tower through the opening 11.

After the framework section 6 is returned into the working position and secured in place, the idler pulley 16 and the tackle 17 are removed and the opening 11 is closed with the cover plate 22.

In the embodiment employing supports 23 located outside the cooling tower, the framework sections 6 are moved onto the platform 12 and returned into the working position in the same manner.

In the embodiment employing carriers 29 constructed of ropes, the framework sections 6 with the spraying elements 7 accommodated therein are moved through the cooling tower on said carriers, whereas rollers 5 are used for moving said sections on the platform 12.

As can be seen from the aforegoing description, the invention makes it possible to readily replace failed elements of the spraying arrangement without interrupting the operation of the cooling tower, to mechanize repair work and ensure high quality thereof, to replace said elements without delay in the event of impaired cooling action of the spraying arrangement, thereby improving the operation dependability of the cooling tower, to maintain constant cooling performance and, in some embodiments, to improve it.

These advantages are obtainable with various embodiments of the framework sections and various positional arrangements of the framework supports, which feature versatility of the cooling tower constituting this invention.

What is claimed is:

1. A cooling tower having a housing and having openings in the side thereof comprising:
   supports to maintain the housing in an upright position;
   carriers positioned inside the housing and defining compartments in line with the openings, said compartments being in a common horizontal plane;
   a framework section removably positioned in each compartment;
   a plurality of spraying means housed in each framework section;
   an outside platform in combination with the cooling tower for location in close juxtaposition to a selected framework section;
   a water distributing means adapted to communicate with each of said spraying means;
   a first idler pulley positioned on the outer edge of said platform;
   a first winch positioned outside said platform in line with the platform and said framework section;
   a first rope means, which has one end attached to the outside portion of the framework section and the other end passing through the first pulley and is then wound around the first winch, so that when the first winch is activated, it will wind up the first rope means and will move the framework section from said compartment onto said platform;

a tackle secured to a support in the center of the tower;

a second idler pulley secured to a support in the center of the tower;

a second winch positioned beneath the platform; and a second rope means, which has one end attached to the inner portion of the framework section and the other end passing through the tackle and second pulley and then wound around the second winch, so that when the second winch is activated it will wind up the second rope means and will move the framework section from said platform back into said compartment.

2. A cooling tower according to claim 1 further including removable covers for each of said openings.

3. A cooling tower according to claim 1, wherein said carriers extend radially outward from the center of the housing.

4. A cooling tower according to claim 3, wherein said supports are located around the outer periphery of said housing.

5. A cooling tower according to claim 4, wherein said carriers comprise girders.

6. A cooling tower according to claim 4, wherein said carriers are comprised of ropes.

7. A cooling tower according to claim 1, further including rollers positioned between said carriers and said framework section.

8. A cooling tower according to claim 7, wherein the supports are interiorly located and said carriers are disposed horizontally.

9. A cooling tower according to claim 7, wherein said carriers extend radially outward from the center of the housing.

10. A cooling tower according to claim 9, wherein said supports are located around the outer periphery of said housing.

11. A cooling tower according to claim 1, wherein said water distributing means is a central water distributing standpipe.

* * * * *